(12) United States Patent
Hong et al.

(10) Patent No.: US 8,013,889 B1
(45) Date of Patent: Sep. 6, 2011

(54) PERIPHERAL VIEWING SYSTEM FOR A VEHICLE

(76) Inventors: Brian KwangShik Hong, Los Angeles, CA (US); Ran Soo Hong, Los Angeles, CA (US)

( * ) Notice: Subject to any disclaimer, the term of this patent is extended or adjusted under 35 U.S.C. 154(b) by 2328 days.

(21) Appl. No.: 10/675,746

(22) Filed: Sep. 30, 2003

Related U.S. Application Data

(60) Provisional application No. 60/417,986, filed on Oct. 11, 2002.

(51) Int. Cl.
*H04N 7/18* (2006.01)
(52) U.S. Cl. .......................................... 348/148; 348/143
(58) Field of Classification Search .................. 348/143, 348/148, 564; 340/435, 937
See application file for complete search history.

(56) References Cited

U.S. PATENT DOCUMENTS

| | | | | |
|---|---|---|---|---|
| 3,689,695 A | * | 9/1972 | Rosenfield et al. | 348/148 |
| 5,530,420 A | * | 6/1996 | Tsuchiya et al. | 340/435 |
| 5,574,443 A | * | 11/1996 | Hsieh | 340/901 |
| 5,680,123 A | * | 10/1997 | Lee | 340/937 |
| 5,956,094 A | * | 9/1999 | Chun | 348/564 |

FOREIGN PATENT DOCUMENTS

EP          1 065 642 A2 * 1/2001

* cited by examiner

*Primary Examiner* — Allen Wong
(74) *Attorney, Agent, or Firm* — John R. Kasha; Kasha Law LLC

(57) ABSTRACT

A peripheral viewing system for a vehicle includes a pair of digital cameras, each positioned on the exterior of the vehicle proximately positioned where a side view mirror would typically be mounted. An additional digital camera is mounted on the vehicle roof immediately adjacent the top edge of the rear window. A plurality of LCD's each discretely associated with a corresponding camera are mounted within the vehicle passenger compartment at a location that is readily observable by the vehicle driver. The driver can panoramically view trailing traffic by observing the LCD's in the passenger compartment. One or more infrared phototransistor receivers are positioned at the rear of the vehicle for detecting oncoming vehicles. If the driver attempts to change lanes and activates a turn signal, a warning message will be emitted within the passenger compartment if any of the transistors detect an approaching vehicle within a predetermined range of the vehicle.

4 Claims, 4 Drawing Sheets

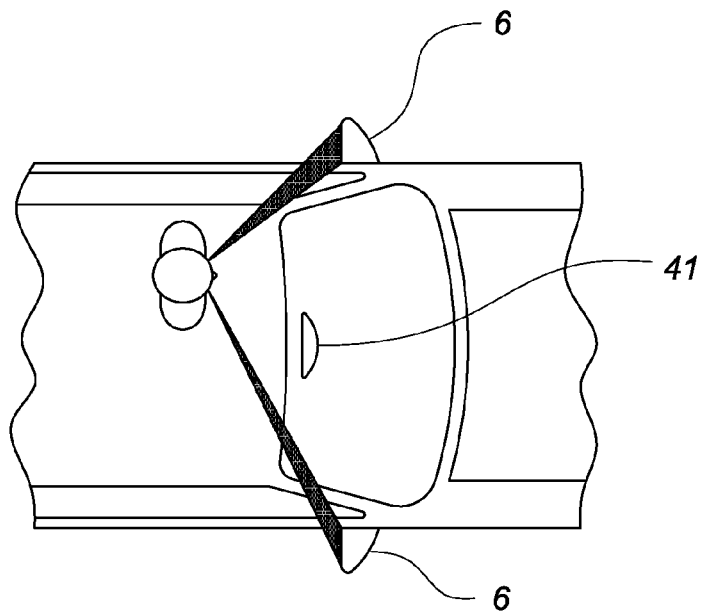
Fig. 1
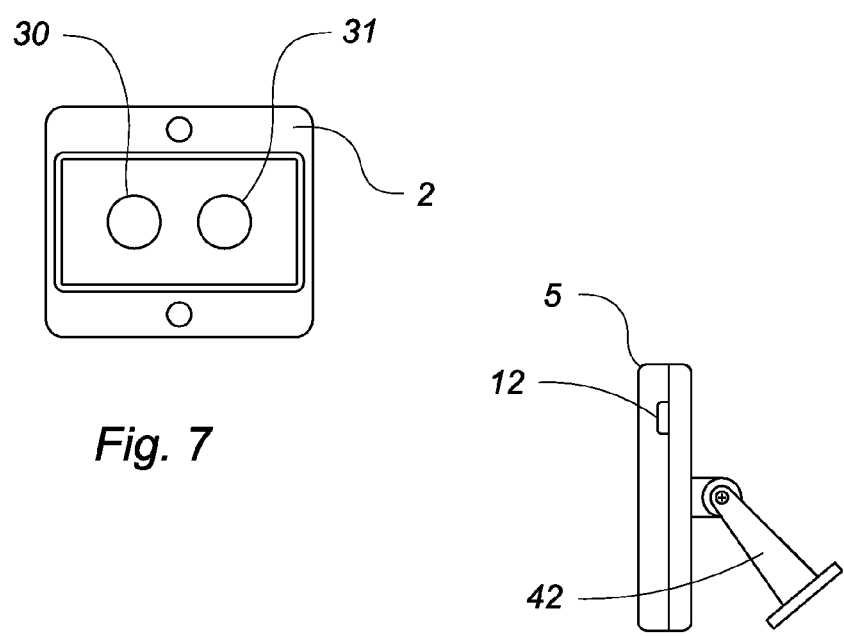
Fig. 7
Fig. 4

US 8,013,889 B1

PERIPHERAL VIEWING SYSTEM FOR A VEHICLE

CROSS REFERENCE TO RELATED APPLICATIONS

This application is entitled to the benefit of provisional application No. 60/417,986 filed on Oct. 11, 2002.

BACKGROUND OF THE INVENTION

The present invention relates to an improved peripheral viewing system for a vehicle that replaces conventional side and rearview mirrors.

DESCRIPTION OF THE PRIOR ART

Vehicles are typically equipped with externally mounted mirrors on each side, positioned immediately in front of the passenger and driver side doors to allow a driver to determine if vehicles are approaching from an adjacent lane. Vehicles are also equipped with a rearview mirror allowing the driver to observe trailing vehicles. However, such mirrors have several disadvantages. The field of view projected by such mirrors is limited thereby resulting in blind spots particularly with respect to the side view mirrors. The blind spots created by the side view mirrors are responsible for numerous accidents.

In an effort to reduce or eliminate the blind spots, automobile manufacturers employ concave or other reduction type mirrors; though such mirrors are somewhat effective in reducing blind spots, they are deceptive in that objects will appear to be smaller or farther away than actual. Finally, the externally mounted side view mirrors are obtrusive and often collide with other objects requiring frequent replacement. The obtrusive mirrors also significantly increase the wind drag on the vehicle. The present invention eliminates the problems associated with conventional side and rear view mirrors by providing a video monitoring system for a vehicle that greatly enhances the viewing range of the driver.

Although at least one vehicle video monitoring system exists in the prior art, the system has several disadvantages. For example, U.S. Pat. No. 5,680,123 issued to Lee discloses a vehicle monitoring system including a plurality of video cameras mounted in various locations on a vehicle exterior, including each side and the rear. A single video display is mounted within the passenger compartment. A specific camera output is only displayed in response to a triggering event such as activation of a turn signal or actuation of a vehicle alarm. If the turn signal is in a neutral position, only the rear camera output is displayed.

The above described device has several disadvantages. In order to display the output of a side video camera, a user activate the turn signal. However, only the side camera corresponding to the direction of the activated turn signal is displayed. Otherwise, the driver can only view the output of the rear camera. Additionally, the system employs a single video display limiting the driver to a single view at any given time. Finally, the system includes no warning system for alerting the driver of an approaching vehicle in the event the approaching vehicle is outside the viewing range of the cameras.

The present invention overcomes the above enumerated problems associated with conventional peripheral viewing systems by providing low profile, aerodynamic, side mounted digital cameras that continuously transmit a digital image to designated display screens within the vehicle passenger compartment allowing a vehicle driver to have a continuous, panoramic view of the vehicle exterior. A similar camera is mounted on the rear of the vehicle that continuously transmits an image to a corresponding display unit. The device also includes rear-mounted infrared sensors for warning the driver if an approaching vehicle is in the "blind spot" and therefore not visible on either of the displays.

SUMMARY OF THE INVENTION

The present invention discloses a peripheral viewing system for a vehicle. The system includes a low profile, externally mounted digital camera positioned immediately in front of both the passenger and driver door, in generally the same location as a conventional side view mirror. A similar low profile digital camera may be mounted on the vehicle roof immediately adjacent the top edge of the rear window. Each camera is electrically connected to a controlling computer that transmits the camera output to a designated LCD mounted within the vehicle passenger compartment. Preferably, the display associated with the driver side camera is positioned immediately to the left of the steering wheel while the display associated with the passenger side camera is mounted in front of the passenger seat but positioned to face the vehicle driver. The rear camera display is mounted immediately to the right of the vehicle steering wheel.

Additionally, the system may also include one or more infrared phototransistor detectors positioned on either side, near the vehicle rear, preferably immediately in front of the taillight. The phototransistor is in communication with the controlling computer and a speaker within the passenger compartment. Accordingly, if a trailing vehicle is approaching in the adjacent lane and is within a predetermined range of the vehicle, a warning signal is sent to the computer instructing it to emit a synthesized voice message warning the driver not to change lanes. The warning message is only emitted, however, if the driver activates a turn signal corresponding to the direction of the approaching vehicle.

It is therefore an object of the present invention to provide a vehicle viewing system that greatly exceeds the capabilities of conventional vehicle side and rear view mirrors.

It is another object of the present invention to provide a viewing system for vehicles that enhances vehicle safety.

It is yet another object of the present invention to provide a peripheral viewing system for a vehicle that eliminates the problems associated with obtrusive side mounted exterior mirrors.

Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a top view of a vehicle with conventional rear and side view mirrors.

FIG. 4 depicts a side view of display panel according to the present invention.

FIG. 7 depicts an infrared phototransistor receiver/transmitter according to the present invention.

DESCRIPTION OF THE PREFERRED EMBODIMENT

Figure 2:
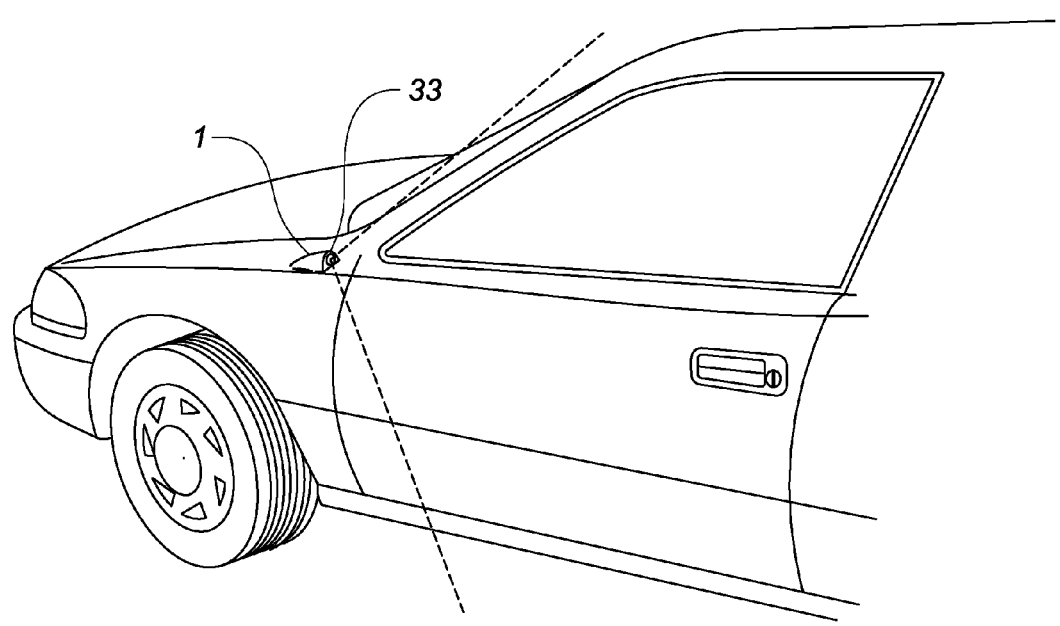
FIG. 2 is a side perspective view of a vehicle with a digital camera mounted thereon.
Figure 3:
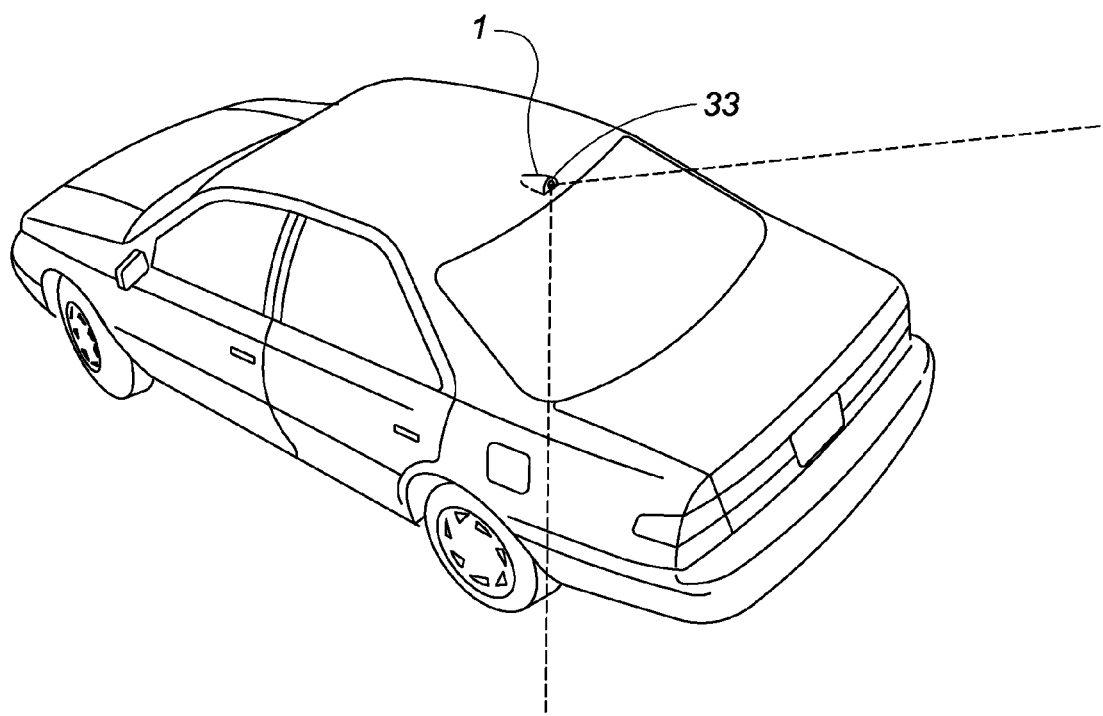
FIG. 3 is a top perspective view of the vehicle with the rear digital camera mounted thereon.
Figure 5:
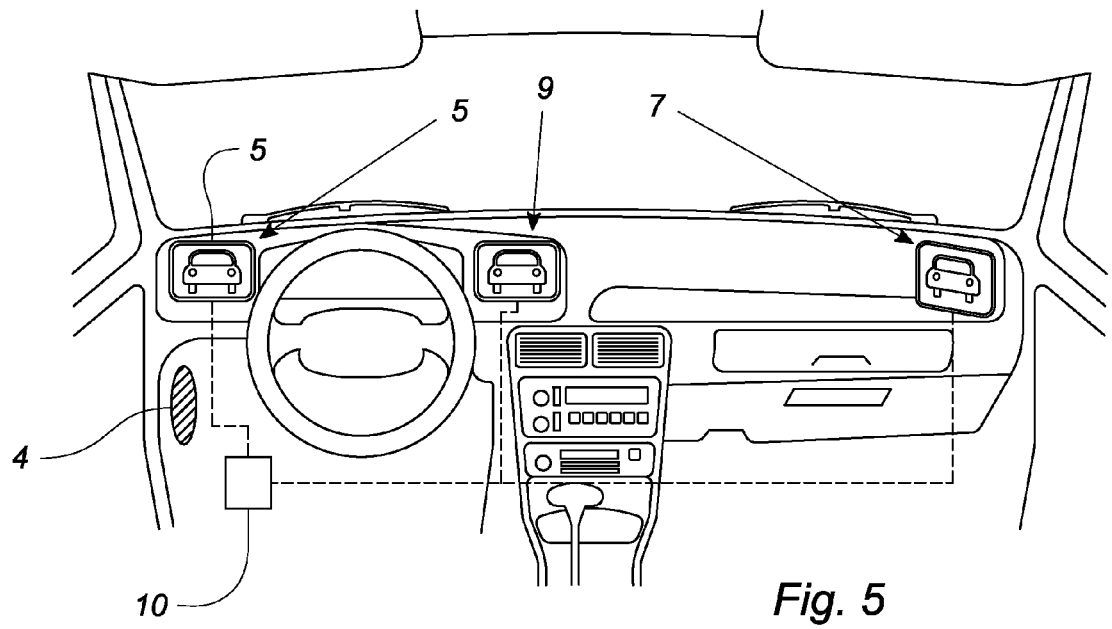
FIG. 5 depicts a vehicle interior with the display panels mounted therein.
Figure 6:
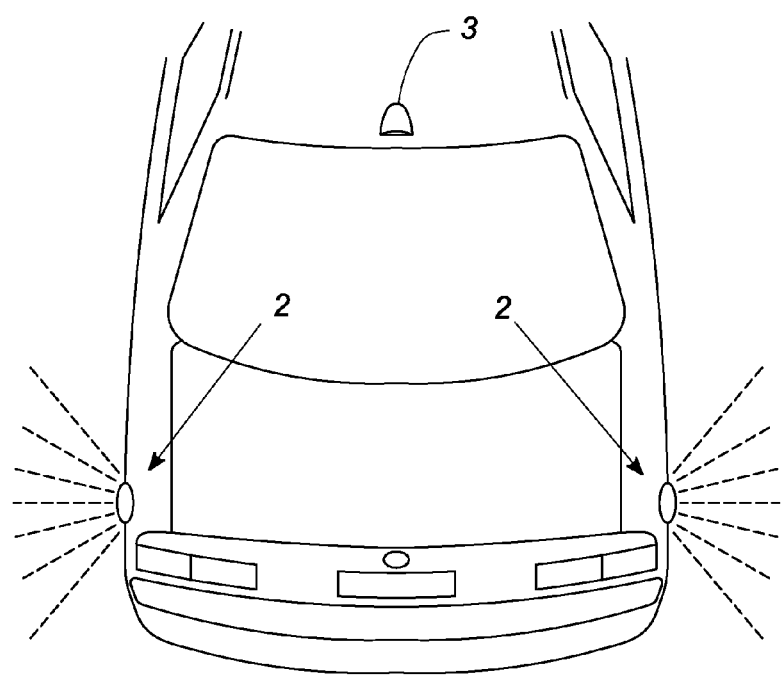
FIG. 6 depicts the infrared sensors mounted on a vehicle.

Now referring to FIGS. 1 through 7, the present invention discloses a peripheral viewing system for a vehicle. The system includes a pair of low profile, externally mounted digital cameras 1 each positioned immediately in front of either the passenger or driver door in generally the same location as a conventional side view mirror 6. Each camera is encased within a contoured, aerodynamic housing 33 to minimize drag. A similar low profile digital camera 3 may be mounted on the vehicle roof immediately adjacent the top edge of the rear window for replacing the conventional rear view mirror 41. Preferably, each camera is a progressive scan, interline-transfer CCD.

Each camera is electrically connected to a controlling computer 10 mounted within the vehicle passenger compartment. The computer interlinks each camera with a designated liquid crystal display (LCD) or similar video display likewise mounted within the vehicle passenger compartment. Preferably, the display 5 associated with the driver side camera is positioned immediately to the left of the steering wheel while the display 7 associated with the passenger side camera is positioned immediately to the right of the steering wheel. In the event that a rearview camera is used, the display 9 associated therewith is mounted immediately to the right of the vehicle steering wheel while the passenger side display panel is mounted in front of the passenger compartment but positioned to face the vehicle driver. Each display also includes a brightness control knob 12 mounted thereon to minimize distraction to the driver. Each display may include a mounting bracket 42 for installing on a vehicle dash board, or the displays may be integral therewith.

Additionally, the system may also include one or more infrared phototransistor detectors 2 positioned on the side of the vehicle, near the rear, immediately adjacent the taillight. The phototransistor is in communication with the controlling computer and a speaker 4. Each phototransistor includes an infrared transmitter LED 30 and a modulated infrared receiver 31. The sensors are able to detect objects within a predetermined range of the vehicle. Preferably, the sensors are operated at 40 Khz modulation so as to reject spurious light.

Accordingly, if a trailing vehicle is approaching in the adjacent lane and is within the predetermined range of the vehicle, a warning signal is sent to the computer instructing it to emit a synthesized voice message via the speaker to warn the driver not to change lanes. The warning message is only emitted however if the driver activates a turn signal corresponding to the direction of the approaching vehicle while the approaching vehicle is within the predetermined range.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A peripheral viewing system for a vehicle wherein said vehicle includes two opposing sides, a steering wheel positioned within a passenger compartment and a rear, the viewing system comprising: a pair of cameras, one of said cameras mounted on one of said sides of the vehicle, another of said cameras mounted on another of said sides of the vehicle; a pair of video displays mounted within said passenger compartment, and positioned therein to be readily visible by a driver, each video display in selective communication with a designated one of said cameras; a microprocessor means in communication with each of said cameras and said displays for continuously processing images received from each of said cameras and for continuously transmitting said images to each of said displays; a third camera mounted on the rear of said vehicle, said third camera connected to said microprocessor means; a third video display mounted within the vehicle passenger compartment, said third video display in selective communication with said third camera via said microprocessor means for continuously depicting images behind said vehicle; a warning means for alerting a driver of an approaching vehicle; wherein said warning means comprises: a phototransistor mounted on each side of said vehicle, adjacent the rear thereof, each of said phototransistors electrically connected to said microprocessor means; an audible alarm means electrically connected to said microprocessor means for audibly alerting a driver if said phototransistors detect a trailing vehicle within a predetermined range of said vehicle; wherein said vehicle includes a turn signal switch means electrically connected to said microprocessor means for exclusively activating said audible alarm means if said trailing vehicle is within the predetermined range of said vehicle.

2. The system according to claim 1 wherein each of said cameras is encased within a contoured, aerodynamic housing to minimize wind drag.

3. The system according to claim 2 wherein one of said displays is positioned immediately adjacent a first side of the steering wheel and another of said displays is positioned immediately adjacent an opposing side of the steering wheel.

4. The system according to claim 3 wherein said third camera is immediately adjacent a top edge of a rear window on the vehicle for replacing a conventional rear view mirror.

* * * * *